United States Patent [19]
Mima et al.

[11] Patent Number: 5,654,726
[45] Date of Patent: Aug. 5, 1997

[54] SCREEN DISPLAY SHARING SYSTEM

[75] Inventors: Yoshiaki Mima, Mitaka; Fumio Ando, Kawasaki; Takashi Sakairi, Tokyo, all of Japan

[73] Assignee: International Business Machines Corporation, Armonk, N.Y.

[21] Appl. No.: 249,587

[22] Filed: May 26, 1994

[30] Foreign Application Priority Data

May 27, 1993 [JP] Japan .................................. 5-125651

[51] Int. Cl.$^6$ .................................................. G09G 5/08
[52] U.S. Cl. .................................................. 345/2; 345/145
[58] Field of Search .................................. 345/1, 2, 145, 345/146; 273/433–438; 434/323; 463/40–42

[56] References Cited

U.S. PATENT DOCUMENTS

| | | | |
|---|---|---|---|
| 4,414,621 | 11/1983 | Bown et al. | 395/153 |
| 5,168,269 | 12/1992 | Harlan | 345/145 |
| 5,469,183 | 11/1995 | Takatsuji et al. | 345/2 |

*Primary Examiner*—Jeffery Brier
*Attorney, Agent, or Firm*—George E. Grosser; Felsman, Bradley, Gunter & Dillon, LLP

[57] ABSTRACT

A pointing object display technique that can manipulate a pointing object without the user being aware of a difference in display time between sites in a distributed computing environment is disclosed. It is so designed that with whatever level of time difference the receiver side receives a pointing object is displayed and confirmed using an auxiliary pointing object on the sender's screen and the positional difference on the display is absorbed. In addition, the receiver side predicts the current position of the sender's pointing object by taking the time difference on the display into account and displays a pointing object at the predicted position on the receiver's screen.

3 Claims, 4 Drawing Sheets

Examples of appearence of pointers at the sender side

Examples of appearence of pointers at the sender side

SCREEN DISPLAY SHARING SYSTEM

BACKGROUND OF THE INVENTION

1. Technical Field

This invention generally relates to distributed applications, for example, computer remote conference system or remote desktop presentation system, which are distributively processed by a plurality of computers, and, particularly, to a method and mechanism for indicating an item displayed on a screen by a user.

2. Description of the Related Art

With the development of communications technology, it has become possible to obtain a fast, highly reliable communication network having less difference in time between a sender and a receiver at a reasonable price. With the background of the improvement of such basic communication technologies, it has become possible to handle shared data by mutually connecting computers assigned to geographically distributed places and by sharing information, such as text, graphics, and images, with computers. Such a technique is called distributed application.

An important feature of the distributed application is the display in real time of identical information on screens or in windows of a plurality of computers, which are mutually connected. Displaying identical screens or windows on screens of computers, which are mutually connected in a distributed system, is called "screen sharing" or "window sharing."

Furthermore, frequently moving objects exist on shared screen displays. These objects are, for example, cursors or pointers, or actual graphical data. They are used to transfer the users' intentions by moving them. Hereafter, they are referred to as pointing objects.

Under a distributed application mechanism, users have conversations with shared "screens" or "windows" as shared data. At this time, users carry out effective conversations on shared data by using an auxiliary audio means, such as a telephone. The users experience less delay due to the use of an auxiliary audio transmission media, such as a telephone. On the other hand, the users cannot ignore overhead for the mutual exchange of information with respect to information displayed on-screen. The actual difference in display time between a sender and a receiver is not negligible. In a channel connecting to a remote site, information can be delayed due to various reasons. Since the speed of light is not infinite, there are situations where these delays cannot be avoided. For example, in international telephone calls using satellite lines, a certain amount of delay occurs, the existence of which people can feel. This difference in time is not significant in the case where a local area network, which does not generate much difference in time in transmission, is used. But, in general, some delays in a channel can be noticed by the user. A dislocation of the position of indicators in two different locations at an identical time can be such a great matter that it cannot be said the identical information is shared.

In a conventional system, users manipulate the system on the assumption that such a difference in time occurs. But in this case, users have to predict how the display of the remote user is seen at all times. It was not a comfortable environment. This kind of problem becomes particularly remarkable when a pointing object is used.

Furthermore, Japanese Patent Application No. 3-222394 relates to this invention. The invention of this application discloses the sharing of applications in a distributed computing environment. Here, the screen is also shared with a plurality of computer systems. However, this application does not mention anything about the pointing object. In addition, PUPA No. 4-284791 discloses the display of a pointing object on the receiving side in response to a pointing object on a transmission side by screen sharing. However, nothing is disclosed with respect to a device for sharing a pointing object by taking communication time difference into account.

SUMMARY OF THE INVENTION

This invention was made taking such circumstances into account. The purpose of this invention is to provide a pointing object display technique enabling the pointing object to be manipulated without being aware of a difference in display time between sites in a distributed computing environment.

The foregoing objects are achieved as is now described. In this invention, to achieve the above-mentioned object, in both sender and receiver, or either one of them, a method for confirming and a system for predicting at what degree of difference in time the opposite side receives information are provided and the difference in display time is absorbed, thereby reducing users' mental burden and making possible of smooth transmission of information.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
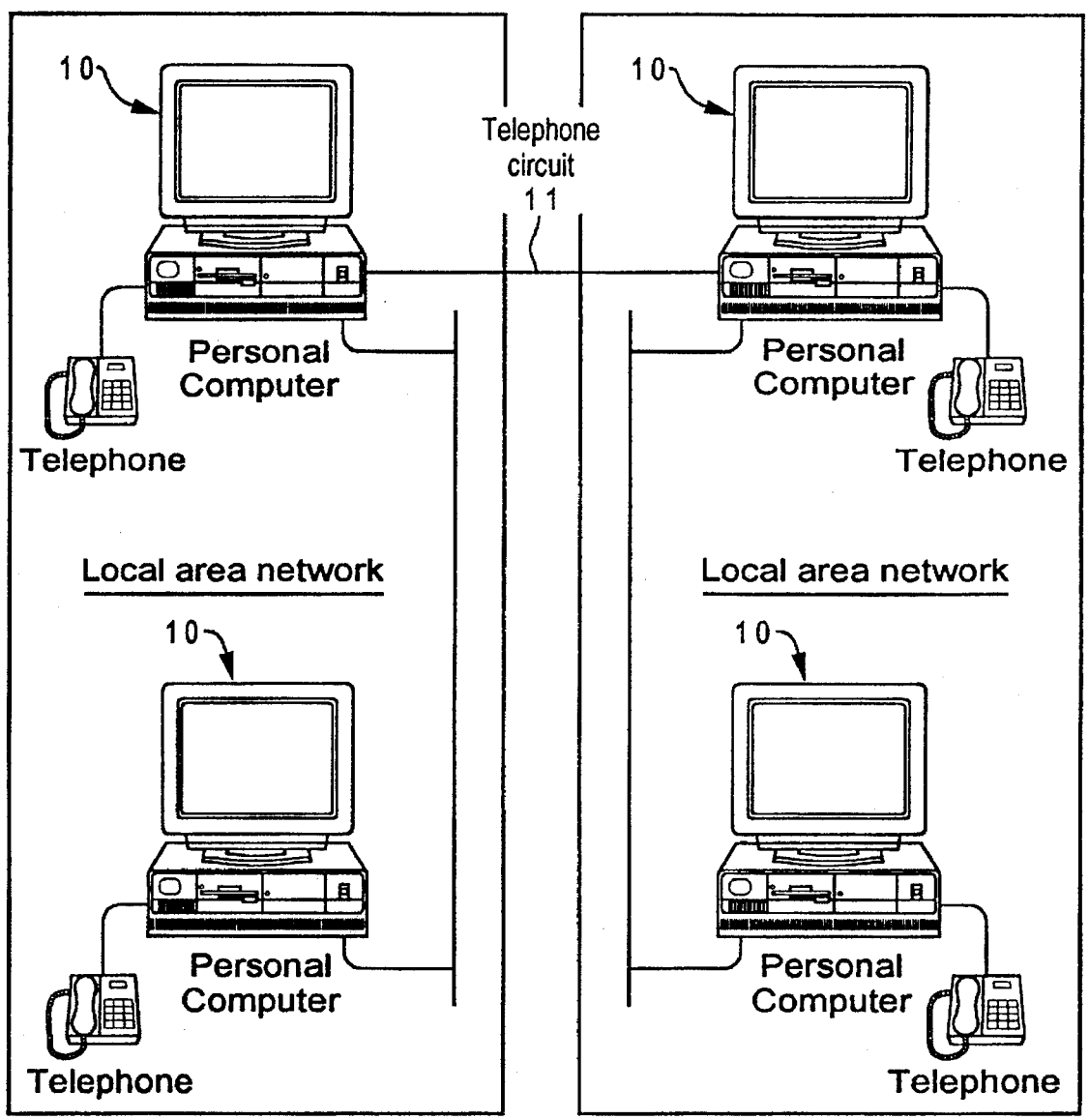
FIG. 1 is a block diagram illustrating a distributed application environment in which the embodiment of this invention operates.

FIG. 1 is a block diagram of a typical environment of a distributed application system in which this invention is used. The system shown in FIG. 1 has a plurality of personal computers 10, which are mutually connected through communication devices (including various communication networks). A typical user shares the information displayed on one personal computer 10 with another user, which is connected to this network through a communication support of the network. Furthermore, in this example, a connection path using a telephone circuit 11, whose overhead for communications becomes large, is utilized.

Since the communication support used in this system is a universal function seen in general personal computer systems, no further explanation will be given on this function.

Figure 2:
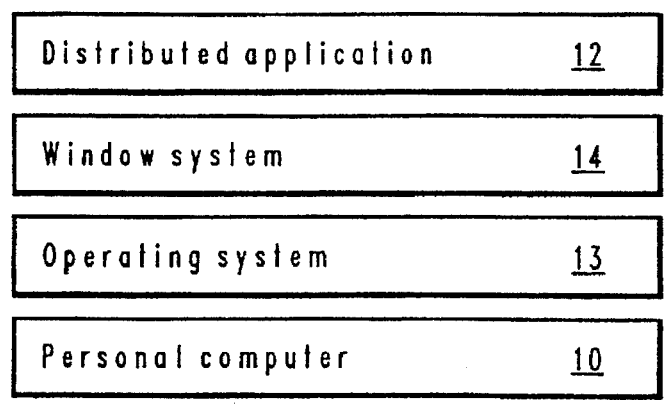
FIG. 2 is a block diagram illustrating a configuration example of the computer system 10 in FIG. 1.
Figure 3:
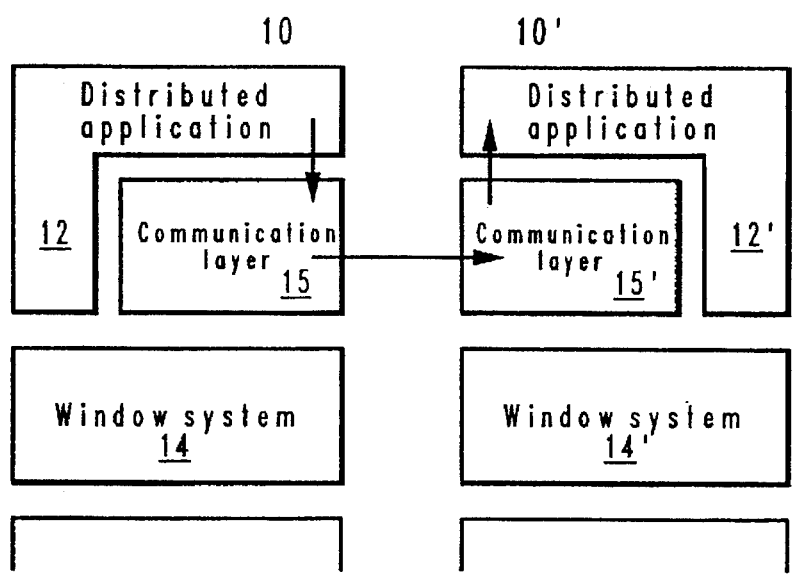
FIG. 3 is a block diagram illustrating an example of operation in the distributed application example.

FIG. 2 shows an overall system configuration of the personal computer 10 on which the distributed application 12, in which this invention provides its function, operates. In this system, the personal computer 10 may be a PS/55 (trademark) of IBM, which has, for example, a processor, display unit, keyboard, mouse, and network adapter. The operating system 13 may be OS/2 (trademark) of IBM, which includes, for example, an input device (keyboard, mouse, etc.) and a presentation manager, which controls communications with a user. The presentation manager also provides the function of the window system 14 for displaying and controlling the window on a display unit.

Furthermore, it is also so arranged that the distributed application 12 operating in this environment sends an event, which is generated in one personal computer 10, to another personal computer 10' through the communication layer 15. For example, it is so arranged that not only the display interface call (for example, application interface call) from the distributed application 12 and mouse messages (these are generated from the window system 14) according to manipulation of a mouse are each processed by the personal computer 10, but also copies of these are prepared and transferred to another personal computer 10' and said event is also processed in another computer system 10'. In general, immediately after activation of applications, this distributed application 12 causes all the screen information possessed by users who are using this application at that moment to coincide. Thereafter, when data on this distributed application 12 is updated by a user, the content of that change changes the display on the personal computer 10 in which a change is made, and at the same time, the notice of update on the display and the contents of the change are transmitted to another personal computer 10' through a communication path by the section performing the communication control.

Users share the identical screen with a difference in time no greater than a predetermined period of time (this difference in time is comparatively short, but not such a thing which can transmit the movement of a mouse). The screen shared in this way can be a screen of a general application, or can also be a screen designed for teleconferencing.

Here, the users use a cursor, a pointer, or a graphic object which can move at a sufficiently high speed among themselves so as to carry out a conversation by indicating a thing on their screens. Hereafter, a thing used for this indication is referred to as a remote pointer. This remote pointer is interlocked with the movement of a pointing device, such as a mouse, and is designed to indicate a thing on a screen quickly by a user.

The following explains a mechanism (pointer control section) in which a positional difference between the remote pointers in a plurality of environments reduces a burden so that users may have a smooth conversation.

Figure 4:
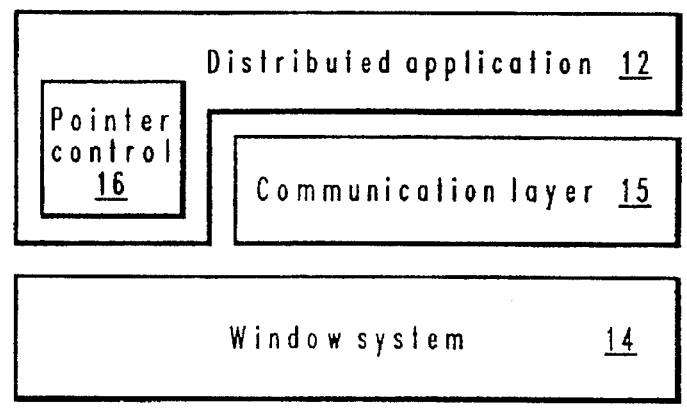
FIG. 4 is a block diagram illustrating a feature of the present invention.
Figure 5:
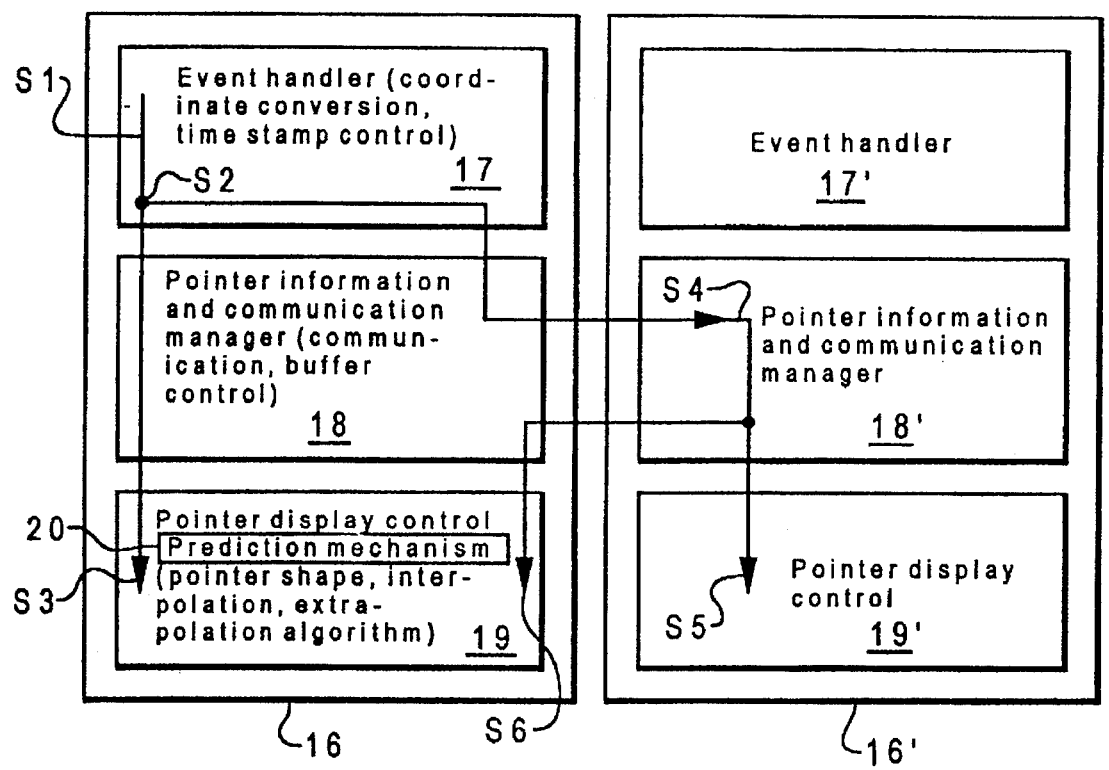
FIG. 5 is a block diagram illustrating a configuration of a feature of the present invention.

As shown in FIG. 4, in this example, the pointer control section 16 is formed in the distributed application 12. In addition, as shown in FIG. 5, the pointer control section 16 is constituted of the event handler 17, which handles pointer-related events, the pointer information and communication manager 18, which controls the communication of pointer information, and the pointer display control section 19, which controls the pointer display. Upon movement of a pointer, how these devices operate will be explained in line with the sequence shown by the arrows in FIG. 5.

Processing of the event handler 17 (local computer system 10)

When a pointing device is moved by a user, along path S1, this information is transmitted to the event processing section (not shown in the figure) of the distributed application 12 through the event queue by the operating system 13 and the window system 14. The event handler 17 has a mechanism for converting a positional coordinate value of the pointing device into a logical coordinate value, which is determined on this shared application 12 as the need arises. The position of the pointing device obtained in this way, via path S2, is transmitted to the pointer information and communication manager 18 and the pointer display control section 19.

Pointer display control section 19 (local)

The pointer display control section 19 is a device having a function for displaying a plurality of pointers and controls the display and movement of a pointer-shaped graphic through the window system 14, on path S3. Since it is so designed that a remote pointer can be displayed on a screen as soon as the pointer display control section 19 receives the positional information of this pointer, it is possible to display a pointer at nearly the same time on a user's display according to the movement of a pointing device. The structure of this pointer display controller 19 will be described later in more detail.

Pointer information and communication manager 18 (local)

The pointer information and communication manager 18 has two functions: one is to let a remote user know the movement of a local pointer and the other is to respond to the movement of the pointer of the remote user.

The pointer information and communication manager 18 receives the positional information of the remote pointer of a sender at nearly the same time as the pointer display control section 19 does. The pointer information and communication manager 18 notifies a receiver of this information and the information of the identification code of the remote pointer, along path S4.

In cases where there are a plurality of senders, this pointer information and communication manager 18 carries out delivery to all the receivers. Otherwise it notifies other places where receivers exist of an identifier enabling the recognition of who is the sender by attaching an event to it, in addition to the preparation of a mechanism for transfer to a plurality of remote users.

Pointer information and communication manager 18 (remote computer system 10)

The information sent is processed by the pointer information and communication manager 18 of a receiver. The pointer information and communication manager 18 of a receiver displays a pointer as a thing to indicate the position of a pointer of the computer system 10 located at another place with the pointer display control section 19 related to it, via path S5. At the same time, the pointer information and communication manager 18 of a receiver returns information of at what position a pointer is displayed to the sender.

Pointer display control section 19 (local)

A sender receives the positional information of this echoed back remote pointer with the pointer information and communication manager 18 and displays the position of the pointer of the remote user in a form which can be distinguished from the remote pointer of the current sender, via path S6. For this, the pointer display control section 19 has a mechanism for displaying a plurality of pointers corresponding to the number of the distributed communication devices without any contradiction as well as a user interface which can distinguish between them. To distinguish between pointers, for example, the arrow of the remote pointer of the sender is displayed with a one painted over and the remote pointer of the receiver is displayed with frame only.

In this connection, in cases where the remote pointer is not moved for a predetermined period of time, the remote pointer of a receiver, which is displayed on a sender side, can have its display temporarily stopped.

Furthermore, it can also be so designed that two modes, a display mode and a non-display mode, are provided so that a sender can select the mode for the remote pointer on the receiver side by taking the appearance of the display of remote pointer on the receiver side into account.

Furthermore, in cases where an estimated value of the time needed for communication is known, the position of the remote pointer of a remote user can be estimated by interpolation or extrapolation on either the sender or receiver side of the positional information of the remote pointer. It may also be so designed that a pointer is displayed at an estimated position by providing the pointer display control section 19 with a mechanism 20 for carrying out such a presumption. Displaying the remote pointer of a remote user is useful to reduce the mental burden of the user, even if it is an estimated value.

Figure 6:
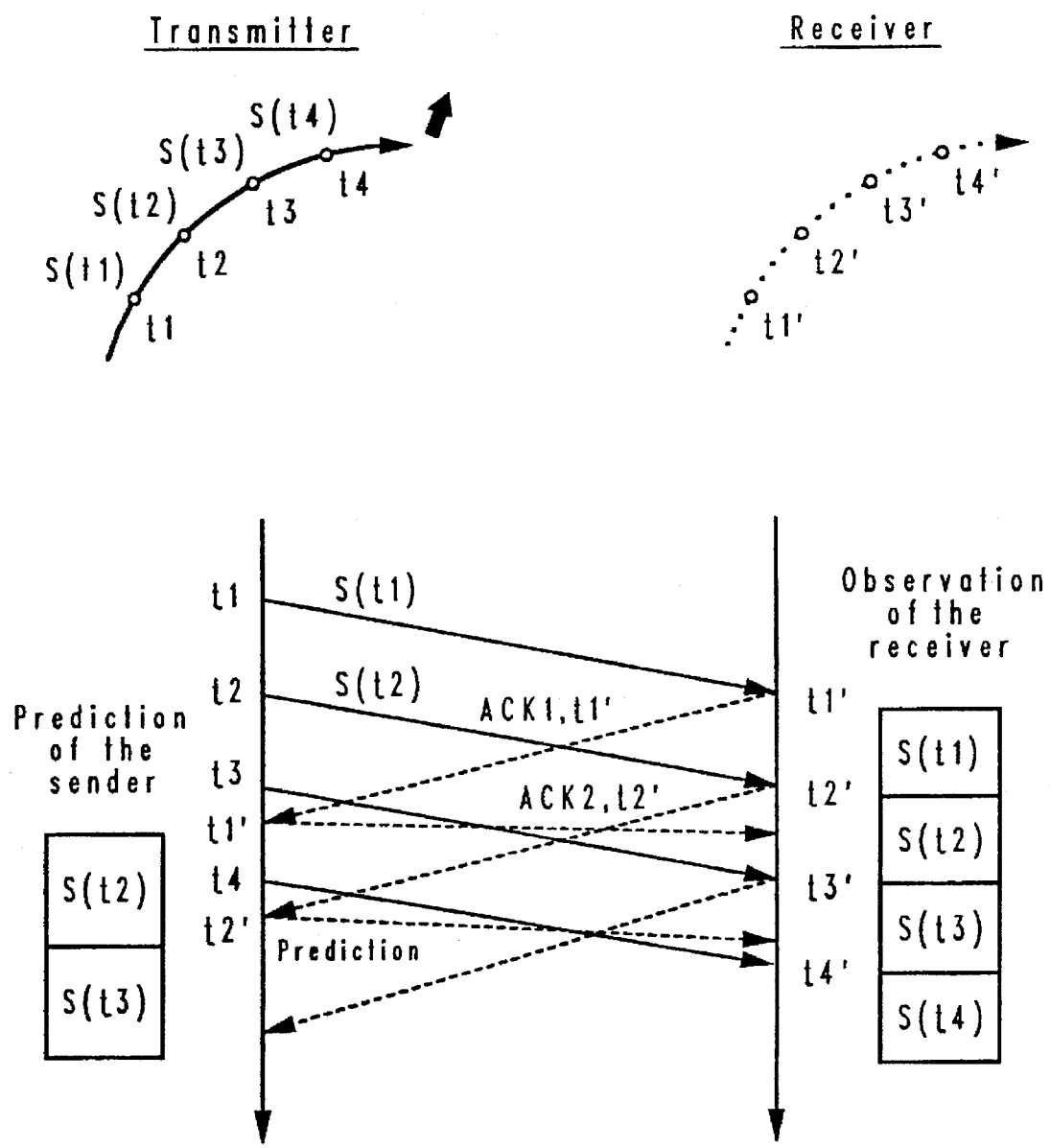
FIG. 6 is a drawing for the explanation of the prediction mechanism 20 in FIG. 5.

The following is a method for predicting the position of a pointer by interpolation and is shown in FIG. 6.

1. Keep a record of information on transmission timing and the pointer. Retain the time in which pointer information was transmitted and its coordinate values. In the example in FIG. 6, timing t1 and position S(t1) are retained.
2. When pointer information is received by a receiver, a remote pointer is displayed at position S(t1) and pointer information is returned to the sender by adding the information of the pointer ID and the receiving timing to the reception acknowledgement packet (ACK). (In the example, pointer ID=1, timing=t1')
3. When a Reception Acknowledgement Packet (ACK) arrives at the sender side, a pointer ID predicted to be displayed on the side of the receiver at present is estimated by the following equation from the time of ACK reception (t1"), the time of reception information in the ACK Packet (t1') on the receiving side, and the packet time of sending (t1) recorded on the sending side. The pointer, which can be distinguished from sender's own pointer by changing the color, is displayed at that position.

The estimated position of pointer is:
E(time of ACK reception)
=S([time of ACK reception−(time of reception−time of transmission)])
=S([time of ACK reception−transmission delay time])
or
=S([(time of ACK reception−time of reception)+time of transmission])
=S([ACK transmission delay time+time of transmission])
However, [t] expresses the maximum sampling timing which does not exceed t. That is, S([t]) expresses the position of the pointer last transferred before time t. For example, $$E(t1") = S([t1"-(t1'-t1)])$$
$$= S([t1"-t1'+t1])$$
$$= S(t2)$$

It is expected that the remote pointer will be displayed at a position S(t2) on the reception side at the time t1" when the reception acknowledgement packet of S([t1]) is returned to the transmission side. Therefore, the pointer on the transmission side is between S(t3) and S(t4) at the time t1", but a pointer having a different color appears at S(t2) as an estimated position of a pointer on the reception side at this time.

In this estimated equation, S ([transmission time]), that is, the same ID as ACK becomes the estimate value when the ACK transmission delay time is small enough, and that equation indicates a basic system using a simple echo back, that is, a system for displaying a pointer at the same pointer ID position as the ACK, which is simply returned without adding timing information, etc. The advantage of this system is that the forecast position in which the pointer is displayed on the reception side at present can be known at the transmission side even if the ACK transmission delay time is great.

In addition, in this system, it is required that the timer difference between participants be sufficiently small with regard to the transmission delay time, but even in cases where this is considered to be difficult, if it is approximated that the outgoing and incoming packet transmission delays are almost the same (or equal), it can be responded to by estimating the situation of the opposite side by taking half the time spent for a reciprocating motion (or proportional division value) as a transmission delay time. The estimated position obtained in this way becomes at least closer to the current position than the simple echo back system which does not carry out estimation.

In addition, contrary to that described in previous section, it is also possible to display a pointer as a predicted position at that position by estimating where the cursor of a sender is at a reception side of the information of the pointer so as to predict the position of the pointer of an opposite side. For that, the following kind of mechanism should be materialized.

1. When the movement of a pointer occurs by manipulation, the ID of this pointer and the positional information of the pointer are sent to the opposite side.
2. At the receiver side, the current position of the pointer is predicted from the past movement of the pointer and a pointer is displayed at the predicted position.

In this system, the sent positional information of the pointer is stored for a fixed number of the latest positions together with the time stamp. To estimate the current position of the pointer on the sender side, take a strategy such that the following position of the pointer is determined from the past behavior of the pointer. For this, select a curve which passes a past sampling point as well as expresses a succeeding movement and assume that the current position of the pointer exists at a position extrapolated on such a curve which passes these points.

As a detailed example, in cases where n sampling points are stored, obtain the equation of an (n−1)-th degree curve which gives a position (x, y) from the time t which passes all these points,

[Equation 1]

$$x(t)=a_0 t^{n-1}+a_1 t^{n-2}+\ldots+a_{n-1}, b_0 t^{n-1}+b_1 t^{n-2}+\ldots+b_{n-1}$$

where, for $$t_i (1 \leq i \leq (n-1))$$

$$x(t_i)=a_0 t_i^{n-1}+a_1 t_i^{n-2}+\ldots+a_{n-1}, y(t_i)=b_1 t_i^{n-2}+\ldots+b_{n-1}$$

is satisfied.

and a point (x(t), y(t)) corresponding to the current (time t) on this curve can be considered to be a predicted point. In a method of only predicting the situation of the receiver by the sender, a difference in time occurs on the receiving side, making it thus useful for sharing the pointer in a situation with as little time difference as possible between the sender and the receiver. But, this method has the defect of lacking accuracy because the movement of the mouse is not always on an extrapolation curve.

However, in cases where simultaneous display of the pointer is important, such a mechanism which suppresses the receiver's error (makes estimation possible) can be materialized by adding some restriction on the movement range of the sender's pointer in addition to this method by the contrary use of the remote pointer system.

For materialization of a mechanism using a system to suppress the movement of the sender's pointer, it becomes possible to minimize the difference of the display position at the same time even though the movement of the sender's pointer does not immediately follow the movement of the mouae.

In this system, it is not necessary to return information to the sender. Therefore, the traffic relating to the overhead generated because of the adoption of this system will not increase even though the number of people communicating increases.

The following describes the interface portion of a real time interactive system using said remote pointer display mechanism.

For this system, operate OS/2 as the operating system and OS/2 PM as the window system on two IBM PS/55 units which are connected by ISDN or an IBM token ring network.

Then, place a graphic tool on this for sharing the screen. This graphic tool shall update the screen under the manipulation of the user and have a mechanism to transmit the contents of the update to the opposite side. In this embodiment, it is guaranteed that the graphic tool performs control in which a plurality of users do not update data at the same time and there is no contradiction in the updated contents.

The event handler is placed in this graphic tool. A device for conversion into logical coordinates absorbs the positional difference of the window and the scale difference of the image by coordinate conversion combining scaling and translating.

In this example, the pointer information and communication manager are used for both communications to update the contents of the graphic tool and communications relating to the remote pointer.

Make the appearance of the remote pointer as follows. First, assign different colors to the remote pointers of machine 1 and machine 2, such as red for one and blue for the other. An example of which is illustrated in FIG. 7.

Figure 7:
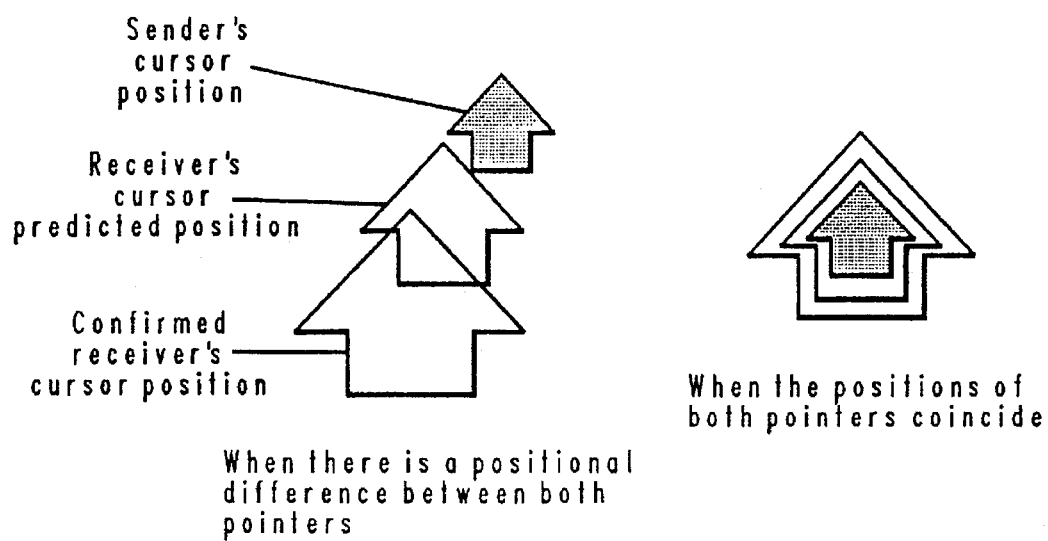
FIG. 7 is a drawing for the explanation of the predication mechanism 20 in FIG. 5.

In FIG. 7, the sender's own remote pointer is displayed by a painted arrow and the receiver's pointer is displayed by an arrow formed by a frame only, which is about two dots larger than the sender's remote pointer, according to the coordinates received from the opposite side as a response in which a display has already been made. In addition, an arrow made of a medium frame only is displayed at a position predicted from the interpolation of where the remote pointer is displayed at present.

In such a display, the pointer may be largely considered to exist on the opposite side in the overlapped position when the pointers overlap.

It is so designed that the position notified as the remote pointer of the opposite side is displayed with a painted arrow and the position where the remote pointer of the opposite side, which is predicted by extrapolation, exists is displayed only with arrows formed of a frame larger by a degree of 1 dot.

As explained above, according to the invention, it is so designed that, in cases where a pointing object is shared with a plurality of computer systems, an auxiliary pointing object, which shows how the pointing object manipulated by the user is seen on the computer system of the opposite side, is displayed on the user's own computer system. Therefore, the user can perform the pointing operation without feeling the burden of predicting a difference in display. In addition, since it is so designed that the current position of the pointing object of the sender is predicted on the computer system on the opposite side so as to reduce the positional difference on the display, the user does not have to be greatly aware of the positional difference on the display.

While the invention has been particularly shown and described with reference to a preferred embodiment, it will be understood by those skilled in the art that various changes in form and detail may be made therein without departing from the spirit and scope of the invention.

What is claimed is:

1. A screen display sharing apparatus for use with a plurality of computer systems connected through a communication network, each of said plurality of computer systems having a display screen and a pointing object, said screen display sharing system comprising:

means within a first computer system for displaying a cursor object moveable on a display screen of said first computer system in accordance with movement of said pointing object;

means within said first computer system for transmitting movement data associated with said cursor object to a second computer system through said communication network;

means within said second computer system for displaying a counterpart cursor object on a display screen of said second computer system in accordance with said movement data associated with said cursor object;

means within said second computer system for transmitting movement data associated with said counterpart cursor object to said first computer system through said communication network; and means within said first computer system for displaying a first auxiliary cursor object on said display screen of said first computer system at a current predicted location of said counterpart cursor object and for displaying a second auxiliary cursor object on said display screen of said first computer system in accordance with said transmitted movement data associated with said counterpart cursor object, said first and second auxiliary cursor objects each comprising an outline display of said cursor object.

2. The screen display sharing system according to claim 1, further including means for eliminating display of said first and second auxiliary cursor object on said display screen of said first computer system after said cursor object stops moving for a predetermined period of time.

3. The screen display sharing system according to claim 1, wherein said predicted location of said counterpart cursor object is determined based upon estimated transmission times.

* * * * *